US009540958B2

(12) United States Patent
Spadacini et al.

(10) Patent No.: US 9,540,958 B2
(45) Date of Patent: Jan. 10, 2017

(54) ORC SYSTEM AND PROCESS FOR GENERATION OF ENERGY BY ORGANIC RANKINE CYCLE (71) Applicant: EXERGY S.P.A., Bologna (IT)

(72) Inventors: Claudio Spadacini, Verbania Suna (IT); Luca Giancarlo Xodo, Grezzago (IT)

(73) Assignee: EXERGY S.P.A., Bologna (IT)

( * ) Notice: Subject to any disclaimer, the term of this patent is extended or adjusted under 35 U.S.C. 154(b) by 269 days.

(21) Appl. No.: 14/400,516

(22) PCT Filed: May 15, 2013

(86) PCT No.: PCT/IB2013/053960
§ 371 (c)(1),
(2) Date: Nov. 11, 2014

(87) PCT Pub. No.: WO2013/171685
PCT Pub. Date: Nov. 21, 2013

(65) Prior Publication Data
US 2015/0159516 A1 Jun. 11, 2015

(30) Foreign Application Priority Data
May 17, 2012 (IT) .............................. MI2012A0852

(51) Int. Cl.
F01K 25/08 (2006.01)
F01K 7/18 (2006.01)
(Continued)

(52) U.S. Cl.
CPC . *F01K 7/18* (2013.01); *F01D 1/06* (2013.01); *F01K 17/02* (2013.01); *F01K 25/08* (2013.01);
(Continued)

(58) Field of Classification Search
CPC ........... F01D 1/06; F01D 5/225; F01K 17/02; F01K 25/08; F01K 7/18; F05D 2220/31; Y02E 20/14; Y02P 80/15
See application file for complete search history.

(56) References Cited

U.S. PATENT DOCUMENTS 1,488,582 A * 4/1924 Allen ........................ F01D 5/04
415/143
2,796,231 A * 6/1957 Hertl ........................ F01D 3/00
415/108

(Continued)

FOREIGN PATENT DOCUMENTS

DE 572 207 C 3/1933
EP 2 375 009 A2 10/2011
(Continued)

*Primary Examiner* — Jesse Bogue
(74) *Attorney, Agent, or Firm* — Pearne & Gordon LLP (57) ABSTRACT An ORC system for generation of energy by Organic Rankine Cycle comprises a turbo-expander (40) of a radial centrifugal type formed by a single rotor disc (108) and provided with an auxiliary opening (40c). The auxiliary opening (40c) is interposed between an inlet (40a) and an outlet (40b) of the turbine (40) and is in fluid connection with an auxiliary circuit (1000, 2000), such as to extract from the turbo-expander (40) or inject into the turbo-expander (40) the organic working fluid at an intermediate pressure between an injection pressure and a discharge pressure.

11 Claims, 5 Drawing Sheets (51) Int. Cl.
*F01D 1/06* (2006.01)
*F01K 17/02* (2006.01)
*F01D 5/22* (2006.01)

(52) U.S. Cl.
CPC ........... *F01D 5/225* (2013.01); *F05D 2220/31* (2013.01); *Y02E 20/14* (2013.01); *Y02P 80/15* (2015.11)

(56) References Cited

U.S. PATENT DOCUMENTS

| | | | | |
|---|---|---|---|---|
| 4,661,042 | A * | 4/1987 | Goloff | F01D 5/043 415/149.1 |
| 5,071,312 | A * | 12/1991 | Kirby | F01D 1/06 29/889.22 |
| 6,272,861 | B1 * | 8/2001 | Bergmann | F01D 25/08 415/115 |
| 8,202,037 | B2 * | 6/2012 | Deidewig | F01D 3/04 415/1 |
| 8,727,705 | B2 * | 5/2014 | Inomata | F01D 25/12 415/117 |
| 2010/0071368 | A1 * | 3/2010 | Kaplan | F01K 7/025 60/651 |
| 2010/0146972 | A1 | 6/2010 | Sorita et al. | |
| 2011/0247331 | A1 | 10/2011 | Goto et al. | |
| 2014/0109576 | A1 * | 4/2014 | Spadacini | F01D 1/06 60/651 |

FOREIGN PATENT DOCUMENTS

| | | |
|---|---|---|
| FR | 1 521 082 A | 4/1968 |
| FR | 2 026 278 A1 | 9/1970 |
| GB | 311 586 A | 5/1929 |
| WO | 2012/143799 A1 | 10/2012 |

\* cited by examiner

ORC SYSTEM AND PROCESS FOR GENERATION OF ENERGY BY ORGANIC RANKINE CYCLE

FIELD OF INVENTION

The present invention relates to an ORC system for producing energy using an Organic Rankine Cycle. In greater detail, the present invention relates to the field of ORC plants and processes with cycles having two or more pressure levels.

PRIOR ART

As is known, in ORC plants, based on a Rankine thermodynamic cycle for conversion of heat energy into mechanical and/or electrical energy, working fluid of an organic type are preferably used (high or medium molecular weight) instead of the traditional water/steam system, as an organic fluid is able to more efficiently convert heat sources at relatively low temperatures, generally between 100° C. and 300° C., but also at higher temperatures. ORC conversion systems therefore are becoming progressively more widely applied in various sectors, for example in the geothermal field, industrial energy recycling, biomass energy production plants, concentrated solar power (csp) plants, regassing plants, etc. A basic plant of known type for conversion of heat energy via an Organic Rankine Cycle (ORC) in general comprises: a heat exchanger/evaporator which exchanges heat between a high-temperature source and a working fluid, so as to heat, evaporate and superheat the working fluid; a turbo-expander supplied by working fluid in the vapour stage in outlet from the heat exchanger, such as to realize a conversion of the heat energy present in the working fluid into mechanical energy according to a Rankine cycle; a generator operatively connected to the turbo-expander, wherein the mechanical energy produced by the turbine is converted into electrical energy; a condenser where the working fluid in outlet from the turbine is condensed and sent to at least a pump. From the pump, the fluid is sent to the heat exchanger.

As well as the configuration described above, an ORC cycle can take on more complicated and articulated known configurations, with the aim of optimizing the performance of the cycle or realizing the cogeneration of electricity and heat, in known ORC plants the cogeneration can occur as counter-pressure cogeneration or cogeneration in the recuperator. In a known configuration of recuperative and cogenerative ORC plants, heat is generated by heating a heat vector fluid by means of the condensation heat. This configuration is commonly known as counterpressure cogeneration. In a different known configuration of ORC plants with a recuperator, in the recuperator the organic fluid vapour discharged from the turbo-expander is used to heat the liquid in delivery from the pump. In this way the quantity of heat exchanger by the evaporator can be reduced and the overall cycle yield increased. Further known a ORC cycle settings in which part of the exchanged heat in the recuperator is used to realize cogeneration.

Document US 2010/0071368 is an example of a two pressure-level process and illustrates an ORC system for heat recycling which includes a first high-pressure turbine and a second low-pressure turbine, in which the first turbine receives high-pressure vapour, the second turbine receives low-pressure vapour and wherein the first turbine also provides low-pressure vapour to the second turbine.

Also known are plants with cogenerative extraction in common vapour turbines, in which the vapour drawn from the turbine exchanges heat with water or another fluid, with the aim of heating the water or fluid. Given the thermodynamic nature of the water, in common vapour plants the vapour is extracted at a temperature of a little more than the condensation temperature. For this reason the extracted vapour from the turbine yields heat directly to the fluid which performs the cogeneration.

Known document GB 311,586 discloses a steam turbine provided with steam chambers in communication with different blade stages.

Known document DE 572 207 discloses a steam turbine provided with two pairs of counter-rotating discs and with channels made through two of the discs to admit high pressure steam.

AIM OF THE INVENTION

In the field of ORC plants, the Applicant has set itself the objective of optimising the apparatus enabling realising cycles with two or more pressure levels, i.e. cycles which include injection of a fraction of the organic working fluid during expansion thereof internally of the turbo-expander or expanders present for that purpose.

SUMMARY OF THE INVENTION

The applicant has attained the objective by adopting a single-rotary disc centrifugal radial turbo-expander which enables performing the injecting of organic working fluid with simple mechanical solutions.

More precisely, the present invention relates to an ORC system (ORC plant, i.e. suitable for using an organic fluid as a working fluid, combined with the organic working fluid) for production of energy via an Organic Rankine Cycle, according to claim 1.

The present invention also relates to an ORC process for energy production by an Organic Rankine Cycle, according to claim 9.

The Applicant has verified that the structure of the single rotor disc centrifugal turbo-expander enables performing the injection of working fluid without negatively impacting on the rotor dynamics of the turbo-expander.

In fact, the implementation of a conduit which opens between the stages of the radial centrifugal turbine so as to realize the auxiliary opening does not lead to a lengthening of the axial dimension of the machine, as instead occurs with axial turbo-expanders. In common axial turbo-expanders used in the ORC field, typically cantilevered with respect to the bearings, the distance between two lines of blades is very small, and performing an injection in this configuration is extremely difficult. Lengthening the axial turbine to enable obtaining the space necessary for the injecting conduit leads to an increase in vibrations and/or to the need to increase the constructive precision of the mechanical elements in order to perfectly balance the machine. On the other hand an increase in the radial dimension of the turbine disc of the present invention advantageously does not equally negatively impact on the dynamics thereof.

In an embodiment, not illustrated, the turbo-expander is provided with a plurality of stages and a plurality of auxiliary openings for injection, each opening between two successive stages. In an embodiment, an auxiliary opening is located between each pair of successive stages. In a different embodiment, the auxiliary openings open only between some of the pairs of stages.

The radial distance between the two stages between which the auxiliary opening is located is greater than the radial distance between the other stages.

The dimensional limits of the distance between the stages are not as narrow as on the axial turbo-expanders, for the reasons mentioned herein above.

The auxiliary opening preferably opens upstream of the most radially peripheral stage (with respect to the direction and sense of the expanding flow).

In a different embodiment, a plurality of stages are present downstream of the opening.

In a preferred embodiment, the single rotor disc is supported cantilevered.

This means that the shaft the rotary disc carries is supported in a casing, for example by two or more bearings, and that the rotor disc is mounted at an end of the shaft that is cantilevered with respect to the casing.

The turbo-expander preferably comprises a static casing, the single rotor disc is housed in the casing and the casing is cantilevered too.

This solution enables containing the volumes of the plant and is made possible by the fact that the single-disc centrifugal turbo-expander is not afflicted by any particular vibrational problems.

The auxiliary opening is preferably afforded in a front wall of the casing.

The expression "front wall" relates to the wall facing the opposite side with respect to the shaft and the bearings.

This solution makes it constructionally simple to mount the pipes of the auxiliary circuit on the casing and place it in fluid communication with the auxiliary opening.

Figure 2:
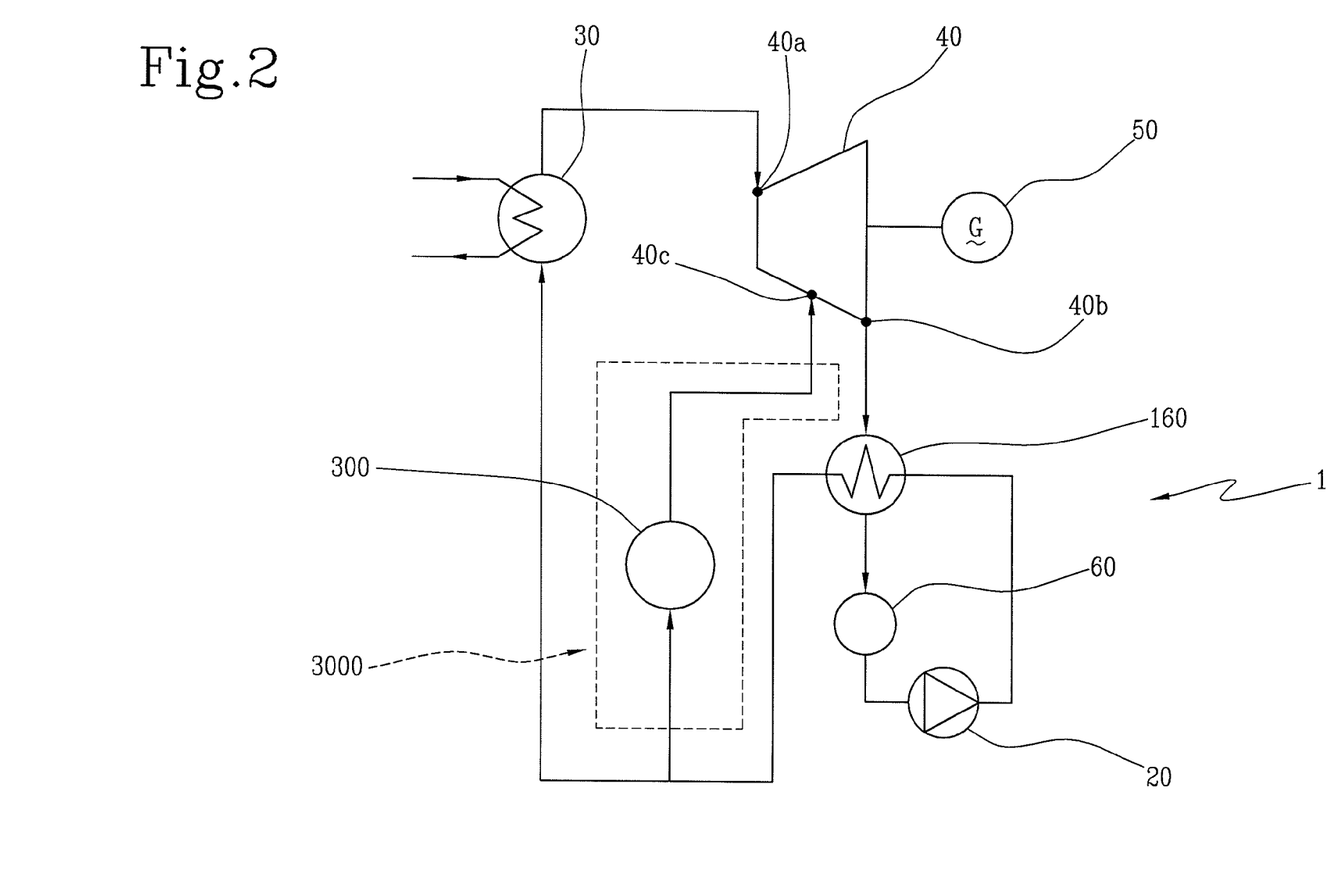
FIG. 2 schematically shows the configuration of a two pressure-level plant for production of energy via the Organic Rankine Cycle according to the present invention.

The injection circuit of working fluid into the turbo-expander preferably comprises a vaporizer; wherein, in the vaporizer, part of the organic working fluid coming out from the condenser or the recuperator or from at least a pre-heater exchanges heat with a high temperature source (not illustrated in FIG. 2) before the part of the organic working fluid coming out from the condenser is re-introduced into the turbo-expander through the auxiliary opening. In other words, a part of the fluid in outlet from the condenser (or from the recuperator, or the pre-heater) receives heat from the high-temperature source in the heat exchanger (conceptually another vaporizer). As can be seen in FIG. 2, this flow is then sent for intermediate injection into the turbo-expander.

BRIEF DESCRIPTION OF THE DRAWINGS

Further characteristics and advantages will more fully emerge from the detailed description of some preferred but not exclusive embodiments of a system for generation of energy by Organic Rankine Cycle according to the present invention. The detailed description of the embodiments will be set down in the following with reference to the appended drawings, provided by way of nonlimiting example, in which.

DETAILED DESCRIPTION

With reference to the figures, 1 denotes in its entirety a plant for energy production by an Organic Rankine Cycle (ORC).

The plant 1 comprises a closed circuit in which an organic working fluid circulates, having a high or medium molecular weight. The fluid can be selected from a group comprising hydrocarbons, ketones, fluorocarbons and siloxanes.

The plant 1 comprises a heat exchanger/evaporator 30 which exchanges heat between a high-temperature source and a working fluid, such as to heat, evaporate and superheat the working fluid; a turbo-expander 40 supplied by the working fluid in the vapourised state in outlet from the heat exchanger 30, such as to realize a conversion of the heat energy present in the fluid into mechanical energy using a Rankine cycle; a generator 50 operatively connected to the turbo-expander 40, in which the mechanical energy produced by the turbo-expander 40 is converted into electrical energy; a condenser 60 where the working fluid in outlet from the turbo-expander 40 is condensed and sent to at least a pump 20. The fluid is sent from the pump 20 to the heat exchanger 30.

The illustrated plant 1 further comprises a recuperator 160 interposed between the turbo-expander 30 and the condenser 60. In the recuperator 160 the organic fluid vapour discharged from the turbine 40 is used to heat the liquid in delivery from the pump 20. In this way the quantity of heat exchanged by the evaporator 30 can be reduced and thus the overall performance of the cycle is increased.

Figure 1:
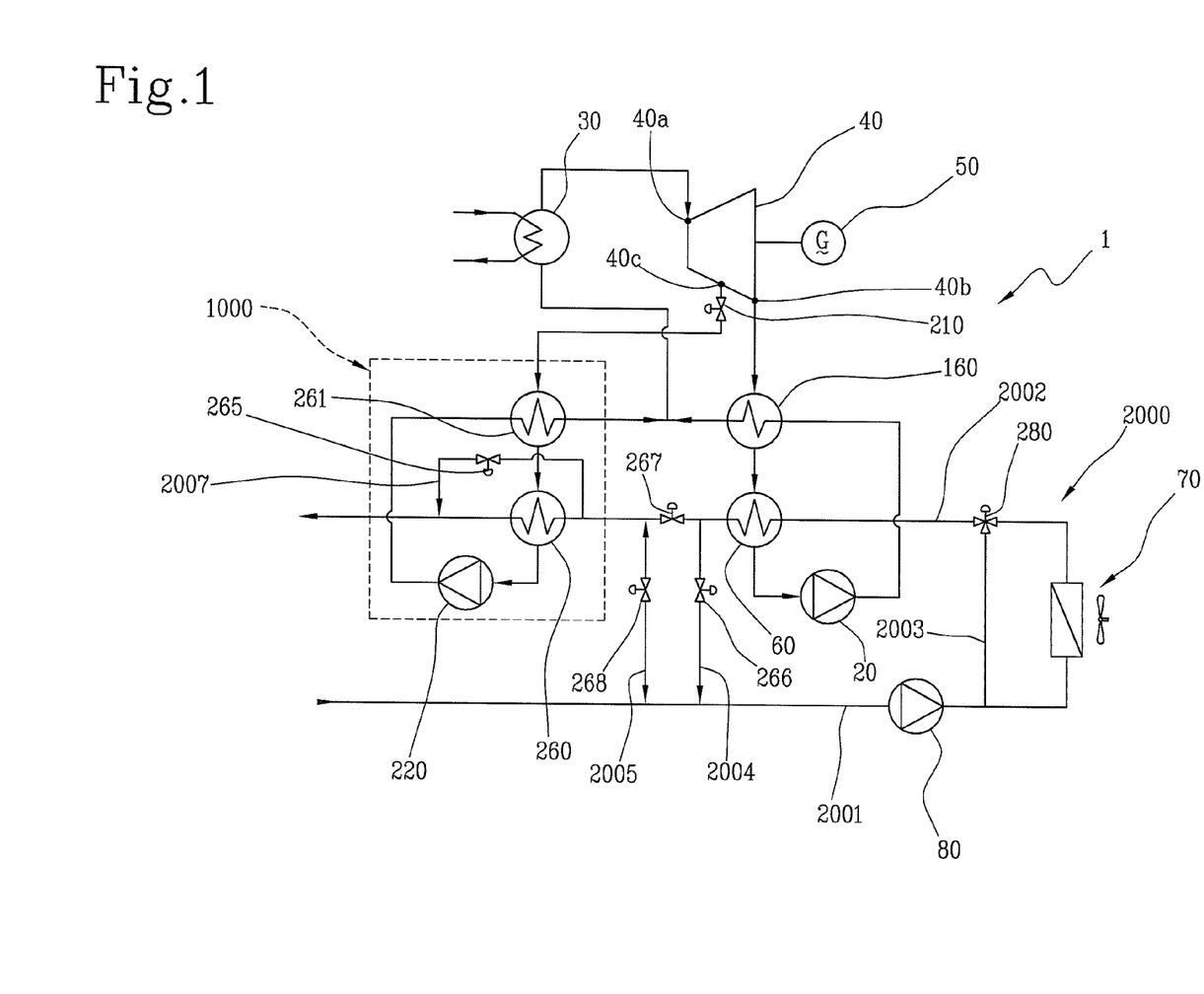
FIG. 1 is a schematic illustration of the configuration of a cogenerative plant for production of energy by means of an Organic Rankine Cycle not part of the present invention.

According to the example represented in FIG. 1, the plant 1 further comprises a cogenerating and recovering circuit 1000 connected to an auxiliary opening 40c (in this case for extraction) of the turbine 40 by means of a first valve 210.

The cogenerating and recovering circuit 1000 comprises a first exchanger 21, a second exchanger 260 and a pump 220.

Figure 1A:
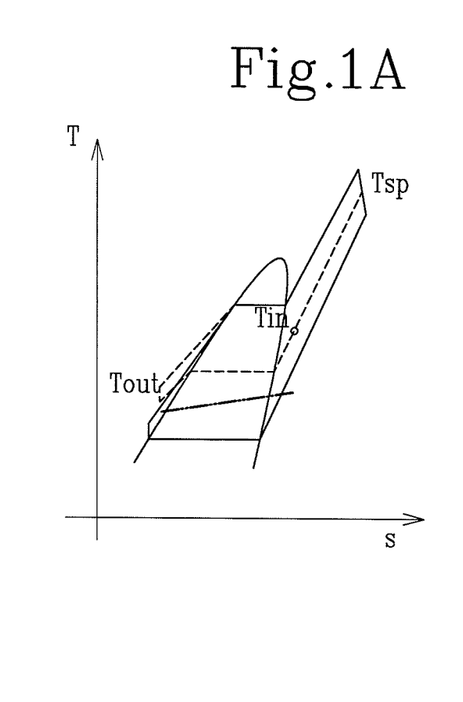
FIG. 1A is a diagram T-s of transformations which occur in the plant of FIG. 1.
Figure 1B:
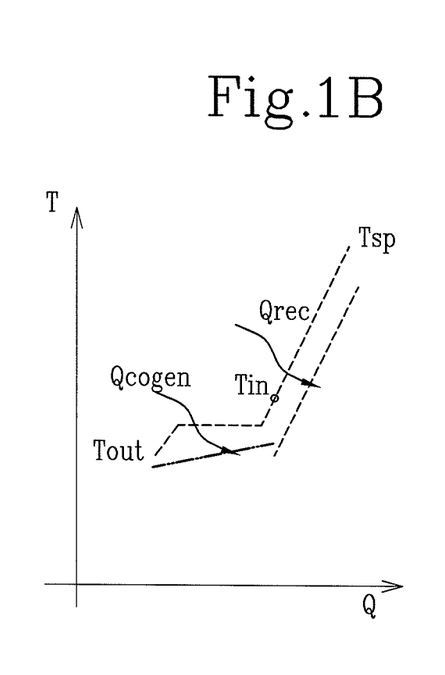
FIGS. 1B, 1C and 1D are diagrams T-q of transformations which occur in the plant of FIG. 1.

The organic working fluid, extracted from the turbine 40 at an intermediate pressure of between entry and discharge pressures, is sent to the first exchanger 261, with the aim of pre-heating the organic fluid in the liquid phase which is re-injected into the plant. In outlet from the first exchanger 261, the organic fluid is sent to the second exchanger 260, where it yields heat to a heat-carrying fluid which transports the heat generated by the ORC plant. The transformations which occur in the exchangers 260 and 261 are represented in the diagrams T-s of FIG. 1A and T-q of FIG. 1B. As can be observed in the diagrams, the organic fluid is extracted from the turbo-expander at temperature Tsp. Given the thermodynamic nature of the organic fluid and the operating parameters of the plant, at temperature Tsp the organic fluid is strongly superheated. For example extracted fluid is at a temperature of about 250° C., while the heat-carrying fluid must be heated from 60° C. to 80° C. The organic fluid extracted from the turbo-expander is cooled in the exchanger 262 to temperature Tin. The fluid at temperature Tin then enters the second exchanger 260 where it yields heat to the heat-carrying fluid and is brought to temperature Tout. By cooling the organic fluid reaches the saturated liquid condition or, if required, the under-cooled liquid condition. From this condition the liquid is pressurized by the pump 220 and pre-heated in the first exchanger 261. When the pre-heating is terminated, the organic liquid is injected into the main thermal cycle, in inlet to the evaporator 30.

FIG. 1 also partially illustrates a heat-carrying circuit 2000 for the heat-carrying fluid which transports the heat generated by the plant 1. The heat-carrying circuit 2000 comprises an outward branch 2001 towards a sink 70 and a return branch 2002 which passes across the condenser 60 and the second exchanger 260 of the plant 1. A pump 80 is arranged on the outward branch. A first bypass branch 2003 with a second three-way valve serves to exclude (or not) the sink 70. The return branch section 2002 interposed between the condenser 60 and the second exchanger 260 of the plant 1 is connected to the outward branch via two connecting tracts 2004, 2005 provided with respective third and fourth valves 266, 268. A further fifth valve 267 is arranged on the return branch between the two sections 2005, 2006 provided with the third and fourth valve 266, 268. A second bypass branch 2007 provided with a sixth valve 265 is located on the return branch 2002 and serves to prevent the heat carrying fluid from transiting through the second exchanger 260.

The illustrated plant enables a good working flexibility. In the following the main functioning set-ups are described.

A—purely electrical set-up: the first valve 210 is closed, the first and the second exchangers 261 and 260 are not supplied, the third valve 266 is open and the pump 80 guarantees the flow supply to the condenser 60 with relatively cold water, by way of example between 30 and 50° C. in inlet, thanks to the dissipation of heat via the sink 70, or alternatively cooling turrets or another solution. In these conditions the electrical performance is maximized thanks to the minimizing of the fluid pressure in the condenser.

B—total cogenerative set-up: there are two different possible set-ups, B1 and B2.

B1—in a case in which the thermal use requires a heat flow with a very limited heat rise DT, for example in the region of 5-10° C., the recycling extraction is kept out of service (first valve 210 closed) and in this case, with the third and fourth valve 266, 268 closed, and the sixth valve 265 open, all the heat discharged from the turbo-expander 40 is recycled into the condenser 60 with typical temperature levels of inlet/outlet of 60/70° C. or 70/80° C. or the like.

Figure 1C:
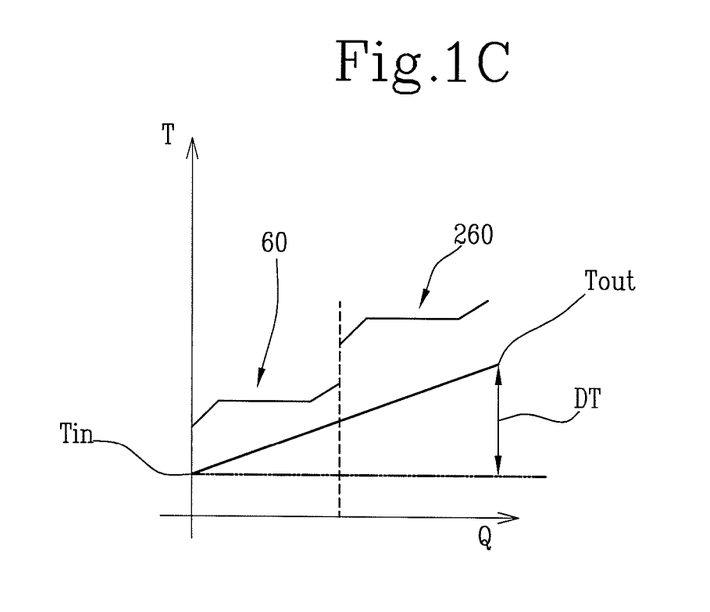

B2—in a case where the thermal use requires higher temperature gradients DT, for example 20-30° C. or even more, the condenser 60 and the second exchanger 260 are operated in series; the sixth valve 265 is now closed, the first valve 210 is open and the third and fourth valve 266 and 268 are closed, or the fourth valve 268 can also partialise the flow in order better to restart the load between the condenser 60 and the second exchanger 260; in this case the heating of the heated fluid vector occurs in part with vapour at greater pressure (in the exchanger 260) and in part at a lower pressure (in the condenser), enabling a cogeneration with a greater electrical yield; the sharing of the thermal load in the condenser 60 and in the second exchanger 260 depends on the pressures at discharge and on extraction of the turbo-expander 40 and on the requested temperature level. Typical inlet temperature levels can be 60-90° C., 70-100, 80-110° C. The process is described by the diagrams in FIG. 1C.

Figure 1D:
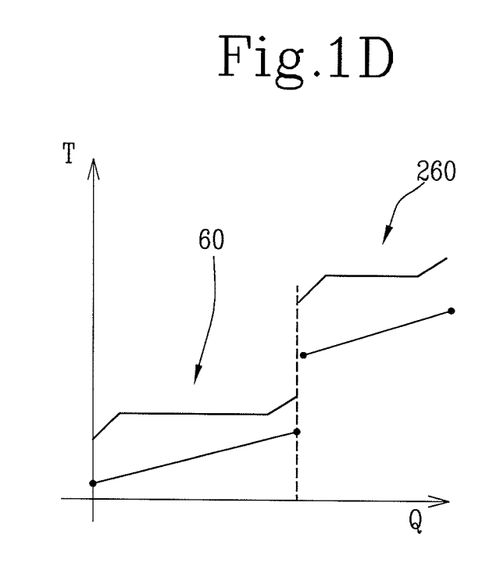

C—partial cogenerative set-up; this set-up is actuated simply by closing the fifth valve 267 and opening the third valve 266 and the fourth valve 268 and also, obviously, the first valve 210. In this case the condenser 60 and the second exchanger 260 are uncoupled and the condenser 60 can be flushed with relatively cold fluid at 30-50° C. so as to maximize the electrical effectiveness of the cycle, while only a fraction of the vapour is drawn from the extractor, which expands in the turbo-expander 40, enabling an optimized functioning in the periods of low thermal load, but not zero. The set-up is described in FIG. 1D.

In a different embodiment according to the present invention and represented in FIG. 2 (in which the heat-carrying circuit/s are not illustrated), instead of the cogeneration and recycling circuit 1000, the plant 1 comprises an inlet circuit 3000 of working fluid into the turbo-expander 40 aimed at performing a cycle at two pressure levels. This inlet circuit 3000 comprises a connecting branch provided with a vaporizer 300 which connects a point located downstream of the pump 20 and the recuperator 160 and upstream of the heat exchanger 30 with the opening of the auxiliary 40c (in this case inlet) into the turbo-expander 40.

Figure 3:
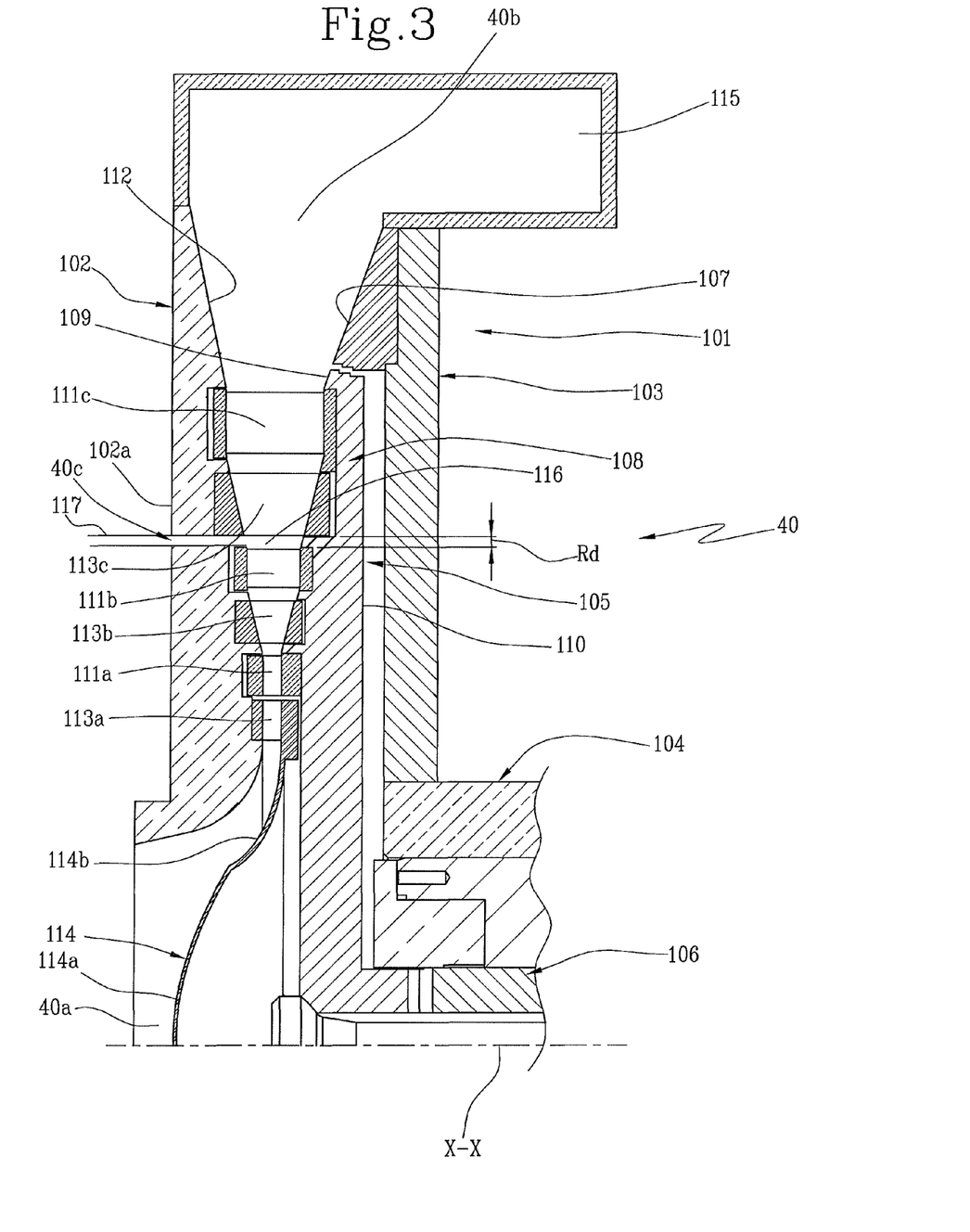
FIG. 3 is a lateral section of a turbo-expander belonging to the plants of FIG. 1 or 2.

In both illustrated embodiments the turbo-expander 40 is of the type described and illustrated in following FIG. 3.

The expansion turbo-expander 40 is advantageously of the multi-stage centrifugal radial type (outflow). In other words, working fluid flow enters the turbo-expander 40 along an axial direction in a radially more internal zone of the turbo-expander 40 and exits, expanded, along a radial or axial direction in a radially more external zone of the turbo-expander 40. In the pathway between the inlet and the outlet the flow continues to distance, while expanding, from the rotation axis X-X of the turbo-expander 40.

The turbo-expander 40 comprises a fixed casing 101 formed by a circular front half-casing 102 and by a rear half-casing 103. A sleeve 104 is cantilevered from the rear half-casing 103, constrained to a bearing structure of the plant.

In the internal volume delimited by the front 102 and rear 103 half-casings, a rotor 105 is housed which is solidly constrained to a shaft 106 in turn rotatably supported in the sleeve 104 by bearings (not illustrated) so as to be free to rotate about a rotation axis X-X.

At the position of the rotation axis X-X, the front half-casing 102 affords an axial inlet opening 40a, and at a radial peripheral portion of the casing 101 a discharge opening 40b is afforded, radially peripheral at a diffuser 107.

The rotor 105 comprises a single rotor disc 108 constrained to the shaft 106, perpendicular to the rotation axis X-X and exhibiting a front surface 109 facing towards the front half-casing 102 and a rear surface 19 facing towards the rear half-casing 110. A passage volume for the organic working fluid is delimited between the front surface 109 of the rotor disc 108 and the front half-casing 102. The front surface 109 of the rotor disc 17 bears three series of rotor blades 111a, 111b, 111c. Each series comprises a plurality of flat rotor blades arranged about the rotation axis X-X. The rotor blades of the second series 111b are arranged in a radially external position with respect to the rotor blades of the first series 111a and the rotor blades of the third series 111c are arranged in a radially external position with respect to the rotor blades of the second series 111b.

Three stator blades 113a, 113b, 113c are mounted on an internal surface 112 facing towards the rotor 105 of the front half-casing 102. Each series comprises a plurality of flat stator blades arranged about the rotation axis X-X. The stator blades of the first series 113a are arranged in a radially internal position with respect to the rotor blades of the first series 113a. The stator blades of the second series 113b are arranged in a radially external position with respect to the rotor blades of the first series 111a and in a radially internal position with respect to the rotor blades of the second series 111b. The stator blades of the third series 113c are arranged in a radially external position with respect to the rotor blades of the second series 111b and in a radially internal position with respect to the rotor blades of the third series 111c. The turbo-expander 40 thus exhibits three stages. Internally of the turbo-expander 40, the working fluid flow that enters the axial inlet opening 40a is deviated by a deflector 114 which exhibits a convex circular shape, is mounted fixed on the casing 103 in front of the rotor 105 and is arranged coaxially of the rotation axis X-X with the convexity facing towards the flow in inlet. The deflector 114 extends radially starting from the rotation axis X-X up to the first series of stator blades 113a. The stator blades of the first series 113a are integrated in the peripheral portion of the deflector 25 and exhibit an end mounted on the internal surface 112 of the front half-casing 102. In greater detail, the deflector 114 is defined by a slim convex plate with radial symmetry which exhibits a convex/concave central portion 114a with the convexity facing towards the front half-casing 102 and towards the axial inlet opening 40a and an annular radially more external portion 114b that is concave/convex with the concavity facing towards the front half-casing 102. The front half-casing 102 and the radially more external portion 114b of the deflector 114 delimit a conduit which guides the working fluid towards the first stage (rotor blades of the first series 111a and stator blades of the first series 113a) of the turbo-expander 40.

The front surface 109 of the rotor disc 108 and the surface 112 of the front half-casing 102 bearing the stator blades 113a, 113b, 113c diverge one from the other in a gradually distancing direction from the rotation axis (X-X) starting from the first stage. The radially more external blades exhibit a height of blade that is greater than the radially more internal blades.

The turbine 4 further comprises the diffusor 107 for the recycling of the kinetic energy located in a radially external position with respect to the third stage (formed by the rotor blades of the third series 11c and stator blades of the third series 113c) and defined by the front surface 109 of the rotor disc 108 and the opposite surface 112 of the front half-casing 102. A volute 115 communicating with an outlet flange is located on the radially external perimeter of the casing 101, at the outlet of the diffuser 107.

The radial distance Rd between the second and third stage, i.e. between the rotor blades of the second series 111b and the stator blades of the third series 113c is greater than the radial distance between the first and the second stage or, more in general, the radial distance between the other stator and rotor blades adjacent thereto.

By way of example, the radial distance of the adjacent blades is about 5 mm while the radial distance Rd between the second and the third stage is about 50 mm, i.e. 10 times greater.

An annular chamber 116 for injection of the organic working fluid is delimited between the second and the third stage.

A conduit 117 (or a plurality of conduits) is afforded in the front half-casing 102, which opens into the chamber 116 and defines the auxiliary opening 40c of the turbo-expander 40. The conduit 117 further opens on a front wall 102a of the front half-casing 102. Appropriate pipes and/or connectors mounted on the front wall 102a enable injecting or removing the organic working fluid into or from the turbo-expander 40.

In the embodiment of FIG. 1, the conduit 117 is connected to the cogenerating and recycling circuit 1000. In the embodiment of FIG. 2, the conduit 117 is connected to the injection circuit 3000 of working fluid into the turbo-expander 40 that is destined to perform a cycle at two pressure levels.

The invention claimed is:

1. ORC system for generation of energy by Organic Rankine Cycle having two or more pressure levels, comprising:
   at least one heat exchanger to exchange heat between a high temperature source and an organic working fluid, to heat, evaporate and superheat said organic working fluid;
   at least one turbo-expander presenting an inlet in use fed with the vaporized organic working fluid coming out from the heat exchanger, to make a conversion of the thermal energy present in the organic working fluid into mechanical energy according to a Rankine cycle;
   at least one condenser where in use the vaporized organic working fluid coming out from an outlet of said at least one turbo-expander is condensed;
   at least one pump to feed the organic working fluid coming out from the condenser to said at least one heat exchanger;
   at least an auxiliary circuit for injection of the organic working fluid into said turbo-expander;
   wherein said at least one turbo-expander is of radial centrifugal type and comprises:
   a single rotor disc carrying a plurality of rotor blades;
   at least an auxiliary opening interposed between the inlet and the outlet and in fluid communication with said auxiliary circuit, to extract or inject the organic working fluid at an intermediate pressure between an inlet pressure and an outlet pressure; wherein the turbo-expander comprises a plurality of stages radially disposed one after the other and wherein the auxiliary opening opens between two of said stages; wherein the radial distance between the two stages between which the auxiliary opening opens is greater than the radial distance between the other stages to delimit an injection chamber of the organic working fluid.

2. The system according to claim 1, wherein the radial distance between the two stages between which the auxiliary opening opens is about ten times greater than the radial distance between the other stages.

3. The system according to claim 1, wherein the auxiliary opening opens upstream of most radially peripheral stage.

4. The system according to claim 1, wherein the single rotor disc is cantilevered.

5. The system according to claim 1, wherein the turbo-expander comprises a static casing, wherein the single rotor disc is housed into the casing wherein the casing is cantilevered too.

6. The system according to claim 5, wherein the auxiliary opening is made in a front wall of the casing.

7. The system according to claim 1, wherein the circuit for injection of working fluid into the turbo-expander comprises a vaporizer; wherein, in use in the vaporizer, part of the organic working fluid coming out from the condenser exchanges heat with a high temperature source before said part of the organic working fluid coming out from the condenser is re-introduced into the turbo-expander through the auxiliary opening.

8. The system according to claim 1, further comprising a recuperator, wherein the inlet circuit comprises a connecting branch provided with a vaporizer which connects a point located downstream of the pump and the recuperator and upstream of the heat exchanger with the auxiliary opening into the turbo-expander.

9. An ORC process for energy production by an Organic Rankine Cycle, comprising:

exchanging heat in at least a heat exchanger, between a high-temperature source and an organic working fluid, such as to heat, evaporate and super-heat the organic working fluid;

supplying the organic working fluid in a vaporized stage in outlet from the heat exchanger through an inlet opening of at least a turbo-expander, to realize a conversion of heat energy present in the organic working fluid into mechanical energy according to a Rankine cycle;

condensing, in at least a condenser, the organic working fluid in the vaporized stage from an outlet opening of the at least a turbo-expander;

supplying, via at least a pump, the organic working fluid coming from the condenser towards the at least a heat exchanger;

wherein the process further includes injecting the organic working fluid into the turbo-expander via at least an auxiliary circuit;

wherein the at least a turbo-expander is a radial centrifugal type and comprises: one only rotary disc bearing a plurality of rotor blades; at least an auxiliary opening interposed between the injection opening and the discharge opening and in fluid connection with the auxiliary circuit;

wherein the organic working fluid is injected into the at least an auxiliary opening at an intermediate pressure between an inlet pressure and a discharge pressure;

wherein the radial distance between the two stages between which the auxiliary opening opens is greater than the radial distance between the other stages to delimit an injection chamber of the organic working fluid.

10. The process according to claim 9, wherein the working fluid flow enters the turbo-expander along an axial direction in a radially more internal zone of the turbo-expander and exits, expanded, along a radial or axial direction in a radially more external zone of the turbo-expander.

11. ORC system for generation of energy by Organic Rankine Cycle having two or more pressure levels, comprising:

at least one heat exchanger to exchange heat between a high temperature source and an organic working fluid, to heat, evaporate and superheat said organic working fluid;

at least one turbo-expander presenting an inlet in use fed with the vaporized organic working fluid coming out from the heat exchanger, to make a conversion of the thermal energy present in the organic working fluid into mechanical energy according to a Rankine cycle;

at least one condenser where in use the vaporized organic working fluid coming out from an outlet of said at least one turbo-expander is condensed;

at least one pump to feed the organic working fluid coming out from the condenser to said at least one heat exchanger;

at least an auxiliary circuit for injection of the organic working fluid into said turbo-expander;

wherein said at least one turbo-expander is of radial centrifugal type and comprises:

a rotor disc carrying a plurality of rotor blades;

at least an auxiliary opening interposed between the inlet and the outlet and in fluid communication with said auxiliary circuit, to inject the organic working fluid at an intermediate pressure between an inlet pressure and an outlet pressure; wherein the turbo-expander comprises a plurality of stages disposed one after the other and wherein the auxiliary opening opens between two of said stages; wherein the distance between the two stages between which the auxiliary opening opens is greater than the distance between the other stages to delimit an injection chamber of the organic working fluid.

* * * * *

UNITED STATES PATENT AND TRADEMARK OFFICE
CERTIFICATE OF CORRECTION

PATENT NO. : 9,540,958 B2
APPLICATION NO. : 14/400516
DATED : January 10, 2017
INVENTOR(S) : Claudio Spadacini et al.

Page 1 of 1

It is certified that error appears in the above-identified patent and that said Letters Patent is hereby corrected as shown below:

In the Claims

At Column 8 Line 42, being Line 2 in Claim 3, after "upstream of", please insert --the--.

At Column 8 Line 48, being Line 4 in Claim 5, please delete "too".

At Column 8 Line 60, being Line 2 in Claim 8, after "wherein the", please delete "inlet circuit" and insert therefor --auxiliary circuit--.

At Column 9 Line 3, being Line 5 in Claim 9, please delete "such as".

At Column 9 Lines 29-33, being Lines 31-35 in Claim 9, please delete "wherein the radial distance between the two stages between which the auxiliary opening opens is greater than the radial distance between the other stages to delimit an injection chamber of the organic working fluid." and insert therefor --wherein the turbo-expander comprises a plurality of stages radially disposed one after the other and wherein the auxiliary opening opens between two of said stages; wherein the radial distance between the two stages between which the auxiliary opening opens is greater than the radial distance between the other stages to delimit an injection chamber of the organic working fluid.--.

At Column 10 Line 29, being Line 29 in Claim 11, after "disposed", please insert --radially--.

Signed and Sealed this
Twenty-first Day of March, 2017

Michelle K. Lee
*Director of the United States Patent and Trademark Office*